United States Patent
Sitaram et al.

(10) Patent No.: US 10,314,053 B1
(45) Date of Patent: Jun. 4, 2019

(54) METHOD AND SYSTEM FOR MANAGING BASE STATION TRANSMISSIONS RESPONSIVE TO INVOCATION OF HIGH-ORDER MODULATION SCHEME COMMUNICATIONS

(71) Applicant: Sprint Spectrum L.P., Overland Park, KS (US)

(72) Inventors: Krishna Sitaram, Chantilly, VA (US); Hemanth B. Pawar, Brambleton, VA (US); Shilpa Kowdley Srinivas, Brambleton, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 81 days.

(21) Appl. No.: 15/656,294

(22) Filed: Jul. 21, 2017

(51) Int. Cl.
| H04W 72/08 | (2009.01) |
| H04W 52/52 | (2009.01) |
| H04W 52/14 | (2009.01) |
| H04L 27/00 | (2006.01) |

(52) U.S. Cl.
CPC ....... *H04W 72/085* (2013.01); *H04L 27/0008* (2013.01); *H04W 52/143* (2013.01); *H04W 52/52* (2013.01)

(58) Field of Classification Search
CPC . H04W 72/085; H04W 52/52; H04W 52/143; H04L 27/0008
See application file for complete search history.

(56) References Cited

U.S. PATENT DOCUMENTS

| 8,908,544 B1* | 12/2014 | Zhang | H04W 52/0245 370/252 |
| 9,660,706 B1 | 5/2017 | Oroskar et al. | |
| 2005/0213543 A1* | 9/2005 | Shimizu | H04L 1/0026 370/335 |
| 2007/0202818 A1* | 8/2007 | Okamoto | H04B 7/0697 455/101 |
| 2007/0281636 A1* | 12/2007 | Kim | H04W 52/42 455/127.1 |
| 2008/0117999 A1* | 5/2008 | Kadous | H04B 7/0417 375/267 |
| 2008/0247330 A1* | 10/2008 | Ko | H04B 7/0617 370/252 |
| 2016/0157133 A1* | 6/2016 | Ehsan | H04W 28/22 370/252 |
| 2017/0289929 A1* | 10/2017 | Komulainen | H04W 52/38 |

* cited by examiner

*Primary Examiner* — Min Jung (57) ABSTRACT

A base station may manage transmissions between the base station and wireless communication devices (WCDs), where the base station serves the WCDs over an air interface, and where the base station is configured to engage in downlink transmission using a particular quantity of transmit antennas. In one example, the base station determines that each of at least one WCD currently being served by the base station is configured to support a particular modulation scheme. And in responsive to the determining, the base station reduces the quantity of transmit antennas and engages in the downlink transmission using the reduced quantity of transmit antennas.

20 Claims, 3 Drawing Sheets

METHOD AND SYSTEM FOR MANAGING BASE STATION TRANSMISSIONS RESPONSIVE TO INVOCATION OF HIGH-ORDER MODULATION SCHEME COMMUNICATIONS

BACKGROUND

A typical wireless communication system includes a number of base stations each radiating to provide coverage in which to serve wireless communication devices (WCDs) such as cell phones, tablet computers, tracking devices, embedded wireless modules, and other wirelessly equipped devices. In turn, each base station may sit as a node on a core access network that includes entities such as a network controller and a gateway system that provides connectivity with an external transport network such as the Internet. With this arrangement, a WCD within coverage of the system may engage in air interface communication with a base station and may thereby communicate via the base station with various remote network entities or with other WCDs served by the base station.

Such a system may operate in accordance with a particular air interface protocol, examples of which include, without limitation, Long Term Evolution (using Orthogonal Frequency Division Multiple Access (OFDMA) and Single Carrier Frequency Division Multiple Access (SC-FDMA)), Code Division Multiple Access (CDMA) (e.g., 1×RTT and 1×EV-DO), Global System for Mobile Communications (GSM), IEEE 802.11 (WiFi), BLUETOOTH, and others. Generally, the air interface protocol may define a downlink (or forward link) for carrying communications from a base station to WCDs served by the base station, and an uplink (or reverse link) for carrying communications from the WCDs to the base station.

In practice, a base station and its served WCDs may utilize various air interface resources to facilitate communication on the downlink and the uplink. By way of example, an LTE air interface on both the downlink and the uplink may span a particular carrier frequency bandwidth (such as 1.4 MHz, 3 MHz, 5 MHz, 10 MHz, 15 MHz, or 20 MHz) that is divided over time into a continuum of 10-millisecond frames each defining ten 1-millisecond subframes or time transmission intervals (TTIs), and each TTI is divided over time into 14 symbol time segments of 66.7 microseconds in which data can be transmitted. Further, the carrier bandwidth is divided into a sequence of 15 kHz subcarriers. As a result, in each TTI, the LTE air interface defines an array of "resource elements" in which data can be communicated.

When the base station has data to transmit to one or more served WCDs, the base station may transmit that data to the WCD(s) at a given moment in time—namely, in a given symbol time segment within a TTI. For instance, the base station could engage in one transmission in a given symbol time segment. Alternatively, the base station can engage in multiple concurrent transmissions in a given symbol time segment. For instance, the base station may engage in multiple concurrent transmissions in the symbol time segment to a single WCD, or may engage in multiple concurrent transmissions in the symbol time segment to multiple WCDs.

The base station may be configured to operate at a particular total transmit power level. This total transmit power level may define for the base station a cumulative transmit power level that the base station can use across the carrier bandwidth in a given symbol time segment. For instance, if the base station engages in one transmission in a given symbol time segment, the base station will engage in that transmission at the total transmit power level. Whereas, if the base station engages in multiple concurrent transmissions in a given symbol time segment, the total transmit power level may be divided among those concurrent transmissions. Further, the total transmit power level could be fixed over time (e.g., the base station may be set to transmit at the same total transmit power level in each symbol time segment) or could vary per symbol time segment or per TTI. And still further, the total transmit power level could be divided equally across the carrier bandwidth among the subcarriers, or could be distributed in some other manner across the bandwidth.

In practice, the base station may also be configured such that the total transmit power level per symbol time segment (or on average per unit time) cannot exceed a specified maximum total transmit power level. This maximum total transmit power level could be specified by a manufacturer, by government regulations, or in some other manner.

In addition, a typical base station may include an antenna structure having multiple transmit antennas, and the base station may be configured to use a particular quantity of those transmit antennas for transmitting to served WCDs. As such, when the base station transmits at its total transmit power level in a given symbol time segment, the total transmit power level will be distributed among that quantity of transmit antennas.

Data communication between a base station and a served WCD over the air interface may operate in accordance with a coding scheme for encoding the data into an encoded bit sequence at the transmitting end, and for correspondingly decoding the encoded bit sequence to uncover the underlying data at the receiving end. Such data communication may also operate in accordance with a modulation scheme that establishes how the bits of the encoded sequence will be modulated onto a carrier signal at the transmitting end, and thus how the bits will be demodulated from the carrier signal at the receiving end. In particular, the modulation scheme may provide for mapping groups of bits from the encoded sequence into symbols that represent phase, amplitude, and/or other air interface characteristics, and then modulating the symbols onto the carrier signal at the transmitting end. This mapping may be defined by a constellation pattern made up of various constellation points, with each point representing a respective symbol.

In practice, modulation schemes may range from low-order to high-order, in terms of how many bits can be mapped per symbol. For instance, higher order modulation schemes map more bits per symbol than lower order modulation schemes, and thus their constellation patterns are more dense and granular than lower order modulation schemes.

When a base station serves a WCD, the base station may select a modulation scheme to use for their air interface communication, with the selection being based on various factors, such as the quality of the WCD's air interface connection with the base station. For instance, the WCD may regularly evaluate its air interface channel conditions and provide the base station with a channel quality report, and the base station may then select a highest-order modulation scheme that is compatible with the WCD's reported channel conditions. If the WCD has poor channel conditions, then the base station may select a relatively low-order modulation scheme, in which case the rate of data communication per resource element would be relatively low. Whereas, if the WCD has good channel conditions, then the base station may select a relatively high-order modulation scheme, in which case the rate of data communication per resource element would be relatively high.

OVERVIEW

A base station's radio equipment may be optimized for operation at up to a particular maximum modulation scheme order. Still, there may be scenarios in which the base station will engage in communication using a modulation scheme that has a higher order than the base station's maximum optimal order, such as when the WCD reports channel conditions associated with such a higher-order scheme, or when a new, higher-order scheme is developed and implemented in the network.

Unfortunately, however, the base station may have difficulty operating at such higher order modulation schemes. As discussed above, higher-order modulation schemes may have more dense and granular constellation patterns than lower-order schemes. Because of this, such patterns may be more susceptible to noise and other imperfections, which may in turn cause other issues, such as high bit rate error. Consequently, if the base station's radio equipment is not optimized to handle such a higher-order scheme, it may be difficult for the base station to clearly distinguish between constellation points, and thus the base station may not be able to sufficiently modulate and/or demodulate at the higher-order scheme. Further, if the base station engages in communication at such a higher-order scheme using its total transmit power level, clipping or associated errors may result.

To avoid clipping or other errors and to engage in higher-order modulation scheme communication with desirable quality, the base station may be configured to reduce its total transmit power level. Such a reduction in the total transmit power would, in effect, reduce the amplitude of the constellation points of the higher-order scheme, thereby making it easier for the base station to clearly distinguish between points and modulate/demodulate at the higher-order scheme.

Unfortunately, however, this reduction in the base station's total transmit power level may in turn reduce the base station's coverage. Such a reduction in coverage may cause problems for various WCDs in the base station's coverage area, most notably WCDs that are farther away from the base station (e.g., at or near the edge of the coverage area). Consequently, it could be useful for the base station to take action to offset or overcome this reduction in coverage.

Disclosed herein is a method and system to help address this issue. In accordance with the disclosure, when the base station reduces its total transmit power level, the base station will also reduce the quantity of transmit antennas that the base station uses for its downlink transmission. As a result, the reduced total transmit power level would be distributed among fewer transmit antennas, thus either offsetting or overcoming any reduction in coverage.

By way of example, if the base station is configured to transmit using 8 transmit antennas and reduces its transmit power level from 40 Watts (W) to 20 W (i.e., a reduction of approximately 3 decibels (dB)) in order to engage in high-order modulation scheme communication, the transmit power level per antenna will be reduced from 5 W per antenna (40 W distributed among 8 antennas) to 2.5 W per antenna (20 W distributed among 8 antennas). But if the base station also reduces its quantity of transmit antennas in this scenario per the disclosure, such as from 8 antennas to 4 antennas, the transmit power level per antenna might not be reduced, but might rather remain unchanged at 5 W per antenna.

Accordingly, in one respect, disclosed herein is a method for managing transmissions between a base station and WCDs, where the base station serves the WCDs over an air interface, and where the base station is configured to engage in downlink transmission using a particular quantity of transmit antennas. In accordance with the method, the base station determines that each of at least one WCD currently being served by the base station is configured to support a particular modulation scheme, and, responsive to the determining, the base station reduces the quantity of transmit antennas and engages in the downlink transmission using the reduced quantity of transmit antennas.

In another respect, disclosed herein is another method for managing transmissions between a base station and WCDs, where the base station serves the WCDs over an air interface, and where the base station is configured to engage in downlink transmission at a total transmit power level and using a particular quantity of transmit antennas, whereby the total transmit power level is distributed among the quantity of transmit antennas. In accordance with the method, the base station determines that each of at least one WCD currently being served by the base station is configured to support a particular modulation scheme, and, responsive to the determining, the base station (i) reduces the total transmit power level to use for engaging in the downlink transmission, (ii) reduces the quantity of transmit antennas to use for engaging in the downlink transmission, and (iii) engages in the downlink transmission using the reduced total transmit power level and the reduced quantity of transmit antennas.

Still further, in another respect, disclosed is a base station. The base station includes a wireless communication interface through which the base station serves over an air interface WCDs, where the wireless communication interface includes a power amplifier and transmit antennas, and where the base station is configured to engage in downlink transmission at a maximum total transmit power level supported by the power amplifier and using a particular quantity of the transmit antennas, with the maximum total transmit power level being distributed among the quantity of transmit antennas. Further, the base station includes a controller including one or more processing units, non-transitory data storage, and program instructions stored in the data storage and executable by the one or more processing units to carry out operations. The operations include determining that each of at least one WCD currently being served by the base station is configured to support a particular modulation scheme, and, responsive to the determining, (i) reducing the maximum total transmit power level to use for engaging in the downlink transmission, (ii) reducing the quantity of transmit antennas to use for engaging in the downlink transmission, and (iii) engaging in the downlink transmission using the reduced maximum total transmit power level and the reduced quantity of transmit antennas.

These as well as other aspects, advantages, and alternatives will become apparent to those of ordinary skill in the art by reading the following detailed description, with reference where appropriate to the accompanying drawings. Further, it should be understood that the descriptions provided in this overview and below are intended to illustrate the invention by way of example only and not by way of limitation.

DETAILED DESCRIPTION

This description will discuss implementation by way of example in the context of LTE. However, it will be understood that principles of the disclosure can extend to apply in other scenarios as well, such as with respect to other air interface protocols. Further, even within the context of LTE, numerous variations from the details disclosed herein may be possible. For instance, elements, arrangements, and functions may be added, removed, combined, distributed, or otherwise modified. In addition, it will be understood that functions described here as being performed by one or more entities may be implemented in various ways, such as by a processor executing software instructions for instance.

Referring to the drawings, as noted above, FIG. 1 is a simplified block diagram of a wireless communication system in which features of the present disclosure can be implemented. In particular, FIG. 1 depicts an example LTE network.

As shown, the example LTE network includes a representative LTE base station (evolved Node-B or "eNodeB") 12 (e.g., macro base station, small cell, relay, or other type of base station), configured to provide a wireless coverage area defining an air interface 14 for communicating with WCDs. Base station 12 then has a communication interface with a serving gateway (SGW) 16, which in turn has a communication interface with a packet-data network gateway (PGW) 18, which provides connectivity with a transport network 20 such as the Internet. Further, base station 12 and SGW 16 have communication interfaces with a mobility management entity (MME) 22, which in turn has a communication interface with a home subscriber server (HSS) 24. These components of the LTE network could sit as nodes on a core packet-switched network operated by an LTE service provider, and the interfaces between the components could be virtual tunnels defined within that core network.

Under LTE, the base station's air interface 14 operates on a carrier, which could be frequency division duplex (FDD), in which separate ranges of frequency are provided for downlink and uplink communication, or time division duplex (TDD), in which a single range of frequency is multiplexed over time between downlink and uplink communication. As described above, on such a carrier the LTE air interface is divided over time into a continuum of 10-millisecond frames each defining ten 1-millisecond subframes or TTIs, and each TTI is divided over time into 14 symbol time segments of 66.7 microseconds. Further, the carrier has a bandwidth (e.g., respectively for its downlink and uplink, if TDD) that is divided into a sequence of 15 kHz sub carriers. With this arrangement, the LTE air interface thus defines, in each TTI, an array of resource elements each occupying a 15 kHz subcarrier and spanning 66.7 microseconds, and the subcarriers of these resource elements can be modulated to represent data for communication over the air interface between the base station and one or more served WCDs.

Figure 1:
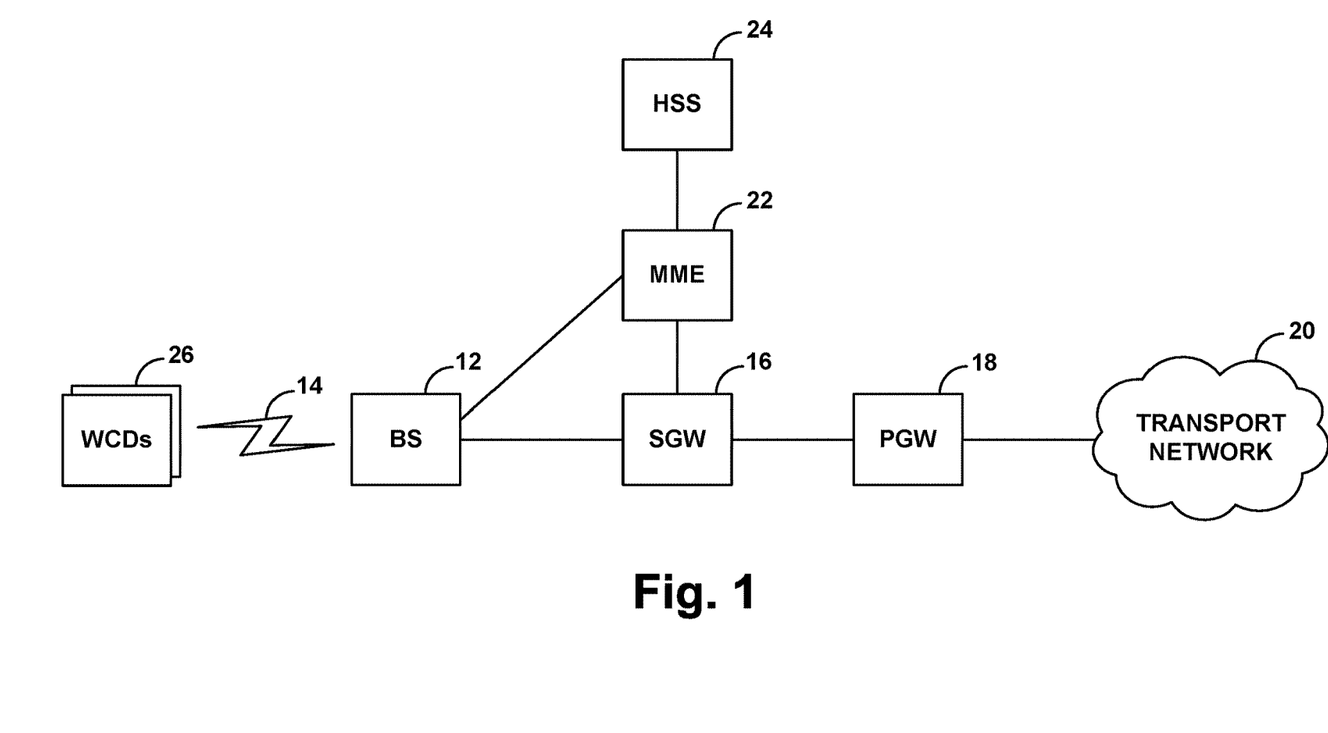
FIG. 1 is a simplified block diagram of an example LTE network.

FIG. 1 depicts multiple WCDs 26 within coverage of the base station 12. Each of these WCDs could take any of various forms (such as a mobile phone, a computer, a tracking device, an embedded wireless module, or other wirelessly equipped device, whether or not user operated), and could be positioned at various locations within coverage of the base station. Some WCDs could be in good coverage, such as being close to the base station and without significant radio frequency (RF) obstructions, and other WCDs could be in poor coverage, such as being far from the base station (e.g., at or near the edge of the coverage area) and/or indoors or otherwise faced with RF obstructions.

When a WCD first powers on or enters into coverage of the network, the WCD could discover coverage of the base station 12 and could then engage in a signaling process to register for service with the base station. In practice, for instance, the WCD may engage in random access signaling with the base station and may then work with the base station to establish a logical Radio Resource Configuration (RRC) connection between the WCD and the base station. The WCD may then engage in attach signaling with the base station and MME, and the MME and HSS may engage in authentication of the WCD. Further, the MME may engage in further signaling with the base station and with the SGW, and the SGW may engage in associated signaling with the PGW, to establish for the WCD one or more bearers for carrying packet data between the WCD and the PGW (and thus between the WCD and the transport network 20). Once the WCD has an established RRC connection with the base station, the base station may receive packet data destined for the WCD, and may engage in downlink transmission of that data on resource elements in one or more symbol time segments.

As described above, at any given moment in time—namely, in a given symbol time segment within a given TTI—the base station may engage in downlink transmission of data to one or more served WCDs. Further, the base station may be configured to only transmit up to a specified maximum total transmit power level per symbol time segment, which could be used for a single transmission, or could be used for multiple concurrent transmissions (in which case the total transmit power level would be divided among the multiple transmissions).

As further described above, the base station may also have multiple transmit antennas, and may be configured to use a particular quantity of such antennas when engaging in downlink transmission to one or more served WCDs. As so configured, when the base station transmits at its total transmit power level, the total transmit power level will be distributed in some manner among that quantity of antennas.

As discussed above, data communication between the base station and the WCD may operate in accordance with a particular coding scheme, as well as a particular modulation scheme. Example modulation schemes include, without limitation, quadrature phase-shift keying (QPSK), in which each resource element represents 2 bits, 8 phase-shift keying (8 PSK), in which each resource element represents 3 bits, 16 quadrature amplitude modulation (16QAM), in which each resource element represents 4 bits, 32QAM, in which each resource element represents 5 bits, 64QAM, in which each resource element represents 6 bits, and 256QAM, in which each resource element represents 8 bits. As further noted, higher-order modulation schemes such as 64QAM or 256QAM may provide faster data transmission than a lower-order modulation scheme such as 8 PSK or 16QAM, because the higher-order modulation schemes would allow transmission of a greater quantity of data within a given number of air interface resource elements.

To select a modulation scheme to use for data communication with the WCD, the base station may apply a mapping table that maps channel quality to respective modulation schemes, from lowest to highest. For instance, such a table may map poor or poorest channel quality to relatively low-order modulation schemes, such as QPSK or 8 PSK, and may map good or best channel quality to relatively high-order modulation schemes, such as 64QAM or 256QAM.

To facilitate application of the mapping table, the base station may regularly receive from the WCD a report including reference signal receive quality (RSRQ) (i.e., a signal to noise ratio) or other measurement of channel quality. The base station may then apply the mapping table to map the WCD's latest channel quality report to a particular highest-order modulation scheme that is compatible with the WCD's reported channel conditions, and the base station may select that particular modulation scheme to use for scheduling transmission of data to the WCD.

In practice, the base station might apply different mapping tables or limit available modulation schemes based on the WCD's capabilities, namely, what modulation scheme(s) the WCD is configured to support. For example, if the base station determines that the WCD supports up to 256QAM, the base station may apply a mapping table that ranges up to 256QAM, whereas, if the base station determines that the WCD supports up to 64QAM, the base station may apply a different mapping table that ranges up to 64QAM.

The base station may learn of the WCD's capabilities in various ways. For example, at or near the end of the WCD attachment process and/or at other times, the WCD may transmit to the base station and/or MME a WCD-capabilities report, which may include a string of bits or other indicator of the particular modulation schemes that the WCD supports (or does not support). Additionally or alternatively, during the attachment process or later, the MME may obtain from the HSS a service profile record for the WCD that includes indications of WCD capabilities such as supported modulation schemes, and the MME may forward that capability information to the base station for later reference by the base station. Other examples are possible as well.

In practice, when the base station schedules data to be transmitted to the WCD, the base station could assign certain downlink resource elements in a given TTI for use to carry the data to the WCD. Then, the base station could (i) transmit to the WCD in that TTI a downlink control information (DCI) message that specifies the assigned resource elements and the selected modulation scheme, (ii) modulate the data in the assigned resource elements in accordance with the selected modulation scheme, and (iii) transmit the data to the WCD in the assigned resource elements in that TTI. The WCD could thus find and read the DCI message to determine the resource elements that carry the data, and the WCD could then demodulate the resource elements in accordance with the selected modulation scheme to obtain the data. Further, the base station may also transmit, in the DCI or in another message, an indication of how many transmit antennas the base station will used for downlink transmission.

As discussed above, the base station may be optimized for operation at up to a maximum modulation scheme order, but there could be instances when the base station uses a modulation scheme that is higher-order than the maximum optimal order, such as when a WCD configured to support the scheme reports channel quality that is high enough to support the scheme. For example, if the base station's maximum optimal order is 64QAM and a 256QAM-supporting WCD reports channel quality high enough to support 256QAM, the base station may select use of 256QAM for communication with the WCD. In practice, there may be multiple such WCDs currently being served by the base station, and thus the base station may use the higher-order scheme for communication with each of those WCDs.

As further discussed above, the base station may have difficulty operating at modulation schemes that are of higher order than the base station's maximum optimal order, and attempts by the base station to operate as such may lead to high bit rate error or other issues. Further, if the base station engages in communication at such a higher-order scheme using the base station's total transmit power level, clipping or associated errors may result. Therefore, to avoid clipping and to engage in higher-order modulation scheme communication with desirable quality, the base station may be configured to reduce the total transmit power level from whatever level the base station is currently set to use for its downlink transmission.

Unfortunately, as noted above, this reduction in the base station's total transmit power level may in turn reduce the base station's coverage, which could cause problems for WCDs that are farther away from the base station, such as WCDs at or near the edge of the base station's coverage area.

In accordance with the present disclosure, as noted above, the base station could engage in a process to help offset or overcome this reduction in coverage. Namely, when the base station reduces its total transmit power level (as a result of the base station detecting that at least one of its currently-served WCDs supports a higher-than-optimal modulation scheme order), the base station will also reduce the quantity of transmit antennas that the base station uses for its downlink transmission.

There may be various ways for the base station to reduce the quantity of transmit antennas that it uses for its downlink transmission. For example, the base station may have stored a table or other data that maps respective reductions in total transmit power levels with corresponding reductions of quantities of transmit antennas, and the base station may refer to this data to determine what the reduced quantity of transmit antennas should be. For instance, such data may indicate that, for every 3 dB reduction in total transmit power level (e.g., from 40 W to 20 W, or from 20 W to 10 W), the base station should reduce the quantity of transmit antennas by half (e.g., from 8 antennas to 4 antennas, or from 4 antennas to 2 antennas).

In an example implementation of the disclosed process, the base station may only reduce the quantity of transmit antennas in response to the base station determining that a threshold high quantity of WCDs currently served by the base station each support a higher-than-optimal modulation scheme order. The threshold for this determination may vary. For instance, the base station may reduce the quantity of transmit antennas only if the base station determines that at least twenty served WCDs each support the higher-than-optimal scheme order. Alternatively, the base station may reduce the quantity of transmit antennas only if the base station determines that at least one served WCD supports the higher-than-optimal scheme order. Other example thresholds are possible as well.

In another example implementation, the base station may be configured to engage in the disclosed process on a per-TTI basis. For instance, when the base station has data to schedule in a given TTI, the base station may determine whether it will be transmitting that data using a higher-than-optimal modulation scheme order, such as by determining that a threshold high quantity of WCDs support that order, as noted above. Then, if the base station determines that it will be transmitting using the higher-than-optimal scheme order, and will thus reduce its total transmit power level, the base station may responsively reduce the quantity of transmit antennas that the base station will use for downlink transmission in that TTI. Further, the base station may responsively also transmit to its served WCDs, in respective DCIs, an indication of the reduced quantity of transmit antennas.

In practice, the amount of clipping may be greater or otherwise more problematic in some scenarios than in others. For example, clipping may be more of an issue when the base station engages in higher-order-than-optimal transmission using its maximum total transmit power level than when the base station engages in such transmission using less than its maximum total transmit power level.

Accordingly, in yet another example implementation, the base station may be configured to consider whether it is set to transmit at its maximum total transmit power level, and use that consideration as a further basis for determining whether to reduce the quantity of antennas that the base station will use for downlink transmission. In particular, when the base station determines that it is set to transmit at its maximum total transmit power level, the base station may responsively reduce its total transmit power level down from the maximum, as well as reduce the quantity of transmit antennas that the base station will use for downlink transmission.

The base station may make this determination in various ways. By way of example, the base station may refer to a power amplifier setting or other stored data that indicates that the base station is set to transmit at its maximum total transmit power level. As another example, the base station may typically be configured to transmit at its maximum total transmit power level when the base station's coverage area is threshold highly loaded, and thus the base station may determine that it is set to transmit at its maximum total transmit power level based on a determination that its coverage area is threshold highly loaded. For instance, the base station may determine that its coverage area is threshold highly loaded based on a determination that (i) a level of resource element utilization exceeds a particular threshold, (ii) a number of served WCDs exceeds a particular threshold, (iii) a level of backhaul utilization exceeds a particular threshold, and/or (iv) a level of processing load exceeds a particular threshold, among other possibilities.

Figure 2:
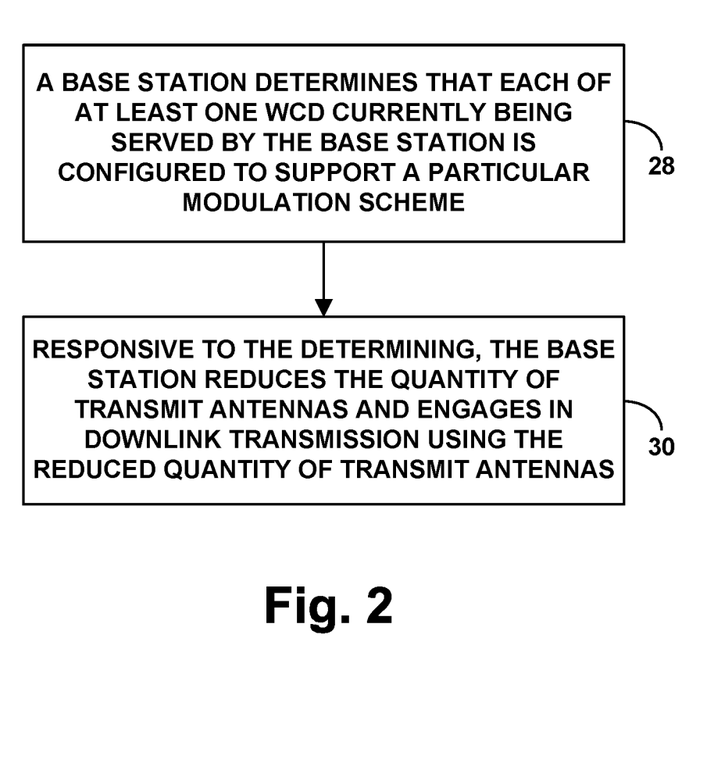
FIG. 2 is a flow chart depicting example operations in accordance with the disclosure.

FIG. 2 is next a flow chart depicting in summary various operations that can be carried out in accordance with the present disclosure, to manage transmissions between a base station and WCDs that the base station serves over an air interface. In line with the discussion above, the base station may be configured to engage in downlink transmission using a particular quantity of transmit antennas.

As shown in FIG. 2, at block 28, the base station determines that each of at least one WCD currently being served by the base station is configured to support a particular modulation scheme. And at block 30, responsive to the determining, the base station reduces the quantity of transmit antennas and engages in the downlink transmission using the reduced quantity of transmit antennas.

In line with the discussion above, the act of the base station determining that each of at least one WCD currently being served by the base station is configured to support the particular modulation scheme may be based on base station consideration of WCD-reported channel quality that corresponds to the particular modulation scheme and/or WCD-capabilities data that indicates WCD-support for the particular modulation scheme.

Further, the act of the base station determining that each of at least one WCD currently being served by the base station is configured to support the particular modulation scheme may involve the base station determining that each such WCD is configured to support a modulation scheme having an order that is at least as high as a predefined threshold. For example, the predefined threshold may be 64QAM (e.g., the base station's maximum optimal modulation scheme order), in which case WCD-support of 256QAM may cause the base station to reduce the quantity of transmit antennas. As another example, the predefined threshold could be 256QAM, in which case WCD-support of 256QAM may cause the base station to reduce the quantity of transmit antennas.

Furthermore, the act of the base station determining that each of at least one WCD currently being served by the base station is configured to support the particular modulation scheme may involve determining that a threshold high quantity of WCDs currently being served by the base station are each configured to support the particular modulation scheme.

As discussed above, the base station may also be configured to engage in downlink transmission at a total transmit power level, and, as a variation of the operations depicted in the flow chart of FIG. 2, the base station may take additional action in response to determining that each of at least one WCD currently being served by the base station is configured to support the particular modulation scheme. For example, the base station may responsively reduce the total transmit power to use for engaging in the downlink transmission. Consequently, the base station will then engage in the downlink transmission using the reduced total transmit power level and the reduced quantity of transmit antennas.

Moreover, in line with the discussion above, the base station may take into account additional considerations as a basis for determining whether to reduce its total transmit power level and reduce the quantity of transmit antennas. For example, as discussed above, the base station may make such reductions in response to the base station's being configured to transmit at its maximum specified total transmit power level. Additionally or alternatively, the base station may make such reductions in response to the base station determining that the base station's coverage area is threshold highly loaded.

Figure 3:
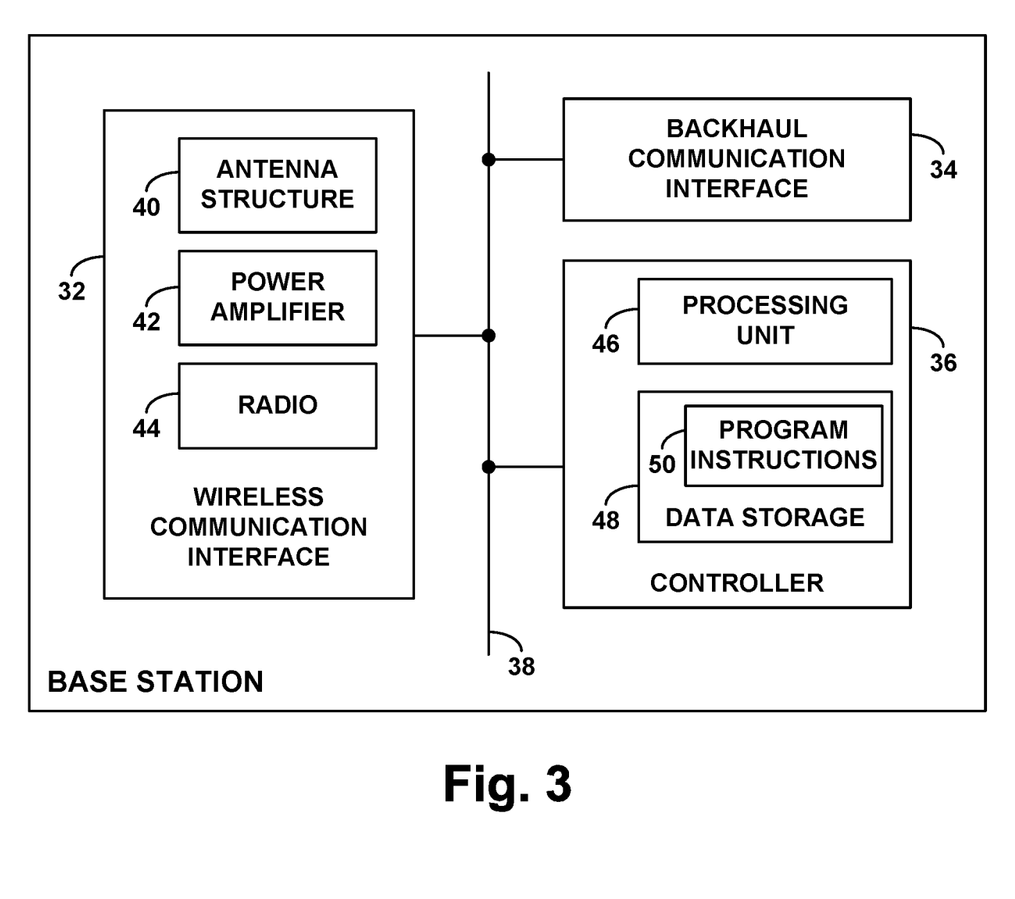
FIG. 3 is a simplified block diagram of a base station that could operate in accordance with the disclosure.

Finally, FIG. 3 is a simplified block diagram of an example base station, showing some of the components that could be included in the base station to facilitate carrying out operations such as those described above. As shown, the example base station includes a wireless communication interface 32, a backhaul network interface 34, and a controller 36, all of which could be integrated together and/or communicatively linked together by a system bus, network, or other connection mechanism 38.

Further, as shown, the wireless communication interface 32 includes an antenna structure 40 that is configured to transmit and receive on the air interface, as well as a power amplifier 42, and radio 44, cooperatively facilitating downlink and uplink communications. As discussed above, the antenna structure 40 may include multiple transmit antennas, of which the base station may use a particular quantity for downlink transmission.

Further, in line with the discussion above, the power amplifier 42 may be configured to output at a particular power level, ranging up to a specified maximum power level supported by the power amplifier. Herein, the power amplifier's output power and maximum power level are considered to be representative examples of the base station's total transmit power level and maximum specified total transmit power level, respectively. However, it should be noted that, in practice, these may not be the same. For instance, it could be the case that the base station's total transmit power level is less than the power amplifier's output power, perhaps due to power loss from the base station's transmit antenna(s).

Still further, in line with the discussion above, the power amplifier 42 and/or the radio 44 may be designed to optimally operate at up to a particular maximum modulation scheme order (e.g., 64QAM).

Lastly, as shown, the backhaul network interface 34 includes one or more network interface modules for coupling with a core network or the like. And the controller 36 includes a processing unit (e.g., one or more microprocessors) 46, non-transitory data storage (e.g. one or more volatile and/or non-volatile storage components such as magnetic, optical, or flash storage) 48, and program instructions 50 stored in the data storage and executable by the processing unit to carry out various base station operations such as those discussed above.

Exemplary embodiments have been described above. Those skilled in the art will understand, however, that changes and modifications may be made to these embodiments without departing from the true scope and spirit of the invention. Further, various features described above with respect to certain embodiments could be implemented in other embodiments described above as well.

What is claimed is:

1. A method for managing transmissions between a base station and wireless communication devices (WCDs), wherein the base station serves the WCDs over an air interface, and wherein the base station has a configuration in which the base station is currently set to use a particular quantity of transmit antennas when engaging in downlink transmission, the method comprising:
   determining, by the base station, that each of at least one WCD currently being served by the base station is configured to support a particular modulation scheme; and
   responsive to the determining, (i) changing, by the base station, the configuration so that the base station is currently set to use fewer than the particular quantity of transmit antennas when engaging in downlink transmission and (ii) engaging, by the base station, in downlink transmission using the fewer transmit antennas.

2. The method of claim 1,
   wherein the configuration includes the base station being currently set to engage in downlink transmission at a total transmit power level distributed among the particular quantity of transmit antennas,
   further responsive to the determining, changing, by the base station, the configuration so that the base station is currently set to use a reduced total transmit power level that is lower than the total transmit power, and
   wherein engaging in downlink transmission further comprises engaging in downlink transmission using the reduced total transmit power level.

3. The method of claim 2, wherein the base station includes a power amplifier, and wherein the total transmit power level is a maximum total transmit power level supported by the power amplifier.

4. The method of claim 1, wherein determining that each of at least one WCD currently being served by the base station is configured to support the particular modulation scheme comprises:
   receiving, from each of at least one WCD currently being served by the base station, a respective channel quality report indicating channel conditions that are compatible with the particular modulation scheme; and
   based on the received channel quality reports, determining that each of at least one WCD currently being served by the base station is configured to support the particular modulation scheme.

5. The method of claim 1, wherein determining that each of at least one WCD currently being served by the base station is configured to support the particular modulation scheme comprises:
   receiving, from each of at least one WCD currently being served by the base station, a respective WCD-capabilities report indicating at least one modulation scheme that the WCD is configured to support, wherein the WCD-capabilities report indicates the particular modulation scheme; and
   based on the received WCD-capabilities reports, determining that each of at least one WCD currently being served by the base station is configured to support the particular modulation scheme.

6. The method of claim 1, wherein determining that each of at least one WCD currently being served by the base station is configured to support the particular modulation scheme comprises:
   receiving, from a network entity that is in communication with the base station, a respective profile record for each of at least one WCD currently being served by the base station, the profile record indicating at least one modulation scheme that the WCD is configured to support, wherein the profile record indicates the particular modulation scheme; and
   based on the received profile records, determining that each of at least one WCD currently being served by the base station is configured to support the particular modulation scheme.

7. The method of claim 1, wherein determining that each of at least one WCD currently being served by the base station is configured to support the particular modulation scheme comprises determining that each of at least one WCD currently being served by the base station is configured to support a modulation scheme having an order of modulation that is at least as high as a predefined threshold.

8. The method of claim 7, wherein determining that each of at least one WCD currently being served by the base station is configured to support the modulation scheme having the order of modulation that is at least as high as the predefined threshold comprises determining that each of at least one WCD currently being served by the base station is configured to support 256 quadrature amplitude modulation (256QAM).

9. The method of claim 1, wherein determining that each of at least one WCD currently being served by the base station is configured to support the particular modulation scheme comprises determining that a threshold high quantity of WCDs currently being served by the base station are each configured to support the particular modulation scheme.

10. A method for managing transmissions between a base station and wireless communication devices (WCDs), wherein the base station serves the WCDs over an air interface, and wherein the base station has a configuration in which the base station is currently set to engage in downlink transmission at a total transmit power level and using a particular quantity of transmit antennas, whereby the total transmit power level is distributed among the particular quantity of transmit antennas, the method comprising:

determining, by the base station, that each of at least one WCD currently being served by the base station is configured to support a particular modulation scheme; and responsive to the determining, the base station (i) changing the configuration so that the base station is currently set to engage in downlink transmission at a reduced total transmit power level and using fewer than the particular quantity of transmit antennas, and (ii) engaging in downlink transmission using the reduced total transmit power level and the fewer transmit antennas.

11. The method of claim 10, wherein the base station includes a power amplifier, and wherein the total transmit power level is a maximum total transmit power level supported by the power amplifier.

12. The method of claim 11, wherein the base station radiates to define a wireless coverage area in which the base station serves the WCDs, the method further comprising:

determining that the coverage area is threshold highly loaded, wherein changing the configuration and engaging in downlink transmission using the reduced total transmit power level and the fewer transmit antennas are performed further responsive to the determining that the coverage area is threshold highly loaded and the total transmit power level being the maximum total transmit power level supported by the power amplifier.

13. The method of claim 10, wherein the air interface is divided into a continuum of downlink subframes, and wherein the method is performed on a per subframe basis.

14. The method of claim 10, wherein determining that each of at least one WCD currently being served by the base station is configured to support the particular modulation scheme comprises:

receiving, from each of at least one WCD currently being served by the base station, a respective channel quality report indicating channel conditions that are compatible with the particular modulation scheme; and based on the received channel quality reports, determining that each of at least one WCD currently being served by the base station is configured to support the particular modulation scheme.

15. The method of claim 10, wherein determining that each of at least one WCD currently being served by the base station is configured to support the particular modulation scheme comprises:

receiving, from each of at least one WCD currently being served by the base station, a respective WCD-capabilities report indicating at least one modulation scheme that the WCD is configured to support, wherein the WCD-capabilities report indicates the particular modulation scheme; and based on the received WCD-capabilities reports, determining that each of at least one WCD currently being served by the base station is configured to support the particular modulation scheme.

16. The method of claim 10, wherein determining that each of at least one WCD currently being served by the base station is configured to support the particular modulation scheme comprises:

receiving, from a network entity that is in communication with the base station, a respective profile record for each of at least one WCD currently being served by the base station, the profile record indicating at least one modulation scheme that the WCD is configured to support, wherein the profile record indicates the particular modulation scheme; and based on the received profile records, determining that each of at least one WCD currently being served by the base station is configured to support the particular modulation scheme.

17. The method of claim 10, wherein determining that each of at least one WCD currently being served by the base station is configured to support the particular modulation scheme comprises determining that a threshold high quantity of WCDs currently being served by the base station are each configured to support the particular modulation scheme.

18. A base station comprising:

a wireless communication interface through which the base station serves over an air interface wireless communication devices (WCDs), wherein the wireless communication interface includes a power amplifier and transmit antennas, and wherein the base station has a configuration in which the base station is currently set to engage in downlink transmission at a maximum total transmit power level supported by the power amplifier and using a particular quantity of the transmit antennas, whereby the maximum total transmit power level is distributed among the particular quantity of the transmit antennas; and a controller including one or more processing units, non-transitory data storage, and program instructions stored in the data storage and executable by the one or more processing units to carry out operations including:

determining that each of at least one WCD currently being served by the base station is configured to support a particular modulation scheme; and responsive to the determining, (i) changing the configuration so that the base station is currently set to engage in downlink transmission at a reduced maximum total transmit power level and using fewer than the particular quantity of the transmit antennas, whereby the reduced maximum total transmit power level is distributed among the fewer transmit antennas, and (ii) engaging in downlink transmission using the reduced maximum total transmit power level and the fewer transmit antennas.

19. The base station of claim 18, wherein determining that each of at least one WCD currently being served by the base station is configured to support the particular modulation scheme comprises determining that each of at least one WCD currently being served by the base station is configured to support 256 quadrature amplitude modulation (256QAM).

20. The base station of claim 18, wherein determining that each of at least one WCD currently being served by the base station is configured to support the particular modulation scheme comprises:

receiving, from each of at least one WCD currently being served by the base station, a respective channel quality report indicating channel conditions that are compatible with the particular modulation scheme; and based on the received channel quality reports, determining that each of at least one WCD currently being served by the base station is configured to support the particular modulation scheme.

* * * * *